United States Patent [19]
Mitchell

[11] 3,717,939
[45] Feb. 27, 1973

[54] SHRINK FILM OVEN
[75] Inventor: John Z. Mitchell, Watertown, Wis.
[73] Assignee: Oven Systems, Inc.
[22] Filed: Feb. 23, 1971
[21] Appl. No.: 118,120

[52] U.S. Cl. ..................34/230, 34/224, 34/225, 34/232, 34/236, 53/184
[51] Int. Cl. ..............................F26b 19/00
[58] Field of Search ....53/30, 184; 34/191, 219, 222, 34/223, 224, 225, 232, 236, 230

[56] References Cited

UNITED STATES PATENTS

| | | | |
|---|---|---|---|
| 3,605,283 | 9/1971 | Zelnick et al. | 34/224 |
| 2,076,415 | 4/1937 | Partsch | 34/222 X |
| 3,621,588 | 11/1971 | Grocke | 34/225 |

Primary Examiner—Kenneth W. Sprague
Assistant Examiner—James C. Yeung
Attorney—Wiviott & Hohenfeldt

[57] ABSTRACT

Objects which are covered with a heat shrinkable plastic film are transported through an oven. The oven is characterized by having an array of hot gas discharge outlets which are fed from a common source. The outlets are equipped with louvers for directing the hot gases in a manner that permits control of the film shrinkage sequence. The outlets are fed from a damper controlled distribution system that is adapted for controlling both the volume and velocity of the hot gases.

8 Claims, 8 Drawing Figures

INVENTOR
JOHN Z. MITCHELL 3,717,939

SHRINK FILM OVEN

BACKGROUND OF THE INVENTION

Heat shrinkable films have been used to package articles for a long time. The method involves enclosing the article in the film and then applying heat to it to shrink the film in which case the film follows the contours of the article. In recent times the method has been extended to packaging large articles or many small articles for the purpose of facilitating handling and to provide protection during warehousing, shipping, and other phases of product manufacture and distribution. Automated and semi-automated systems for packaging articles in heat shrinkable film are now coming into use. In these systems, the film may be deposited manually on the articles or by automatic machinery after which the package is conveyed into an oven where it is subjected to heat. Usually the film encased article can be removed from the oven in less than a minute.

One of the major problems in prior film shrinking ovens has been to control the distribution of the hot gases on the film so it shrinks uniformly and tightly encases the article or articles that are being packaged. When heat distribution is not properly controlled, some areas of the film may size the article prematurely so that adjacent areas are overstressed and subject to rupture when they are shrunk. Other film areas may end up fitting loosely. In some applications, such as where articles are placed on a pallet and covered with an inverted film bag that is open on its bottom end, there is an inclination for the free bottom edges of the bag to creep upwardly if the top closed end of the bag is subjected to excessive heat prematurely. This has been a common problem with the prior art ovens, and only typifies the many problems that have been encountered in connection with shrinking film into all the contours of the packaged article uniformly and without creep and without overstressing or understressing some regions of the film.

Another problem arising in prior film shrink ovens is that of rupturing the film by reason of inadequate control over the velocity and volume of the hot gas. When the film is as hot as is required for maximum production with the oven, the film becomes very plastic and weak and may be ruptured by the force of the hot gas alone.

Heating the film is a function of the rate at which heat can be extracted from the hot gas and this depends on the temperature volume and velocity parameters of the gas which impinges on any given region of the package. All of these parameters must be coordinated to obtain proper packaging.

SUMMARY OF THE INVENTION

A primary object of the present invention is to overcome the above-noted problems and disadvantages in film shrink ovens.

A more specific object of this invention is to provide a film shrink oven with a system for distributing hot gas in the oven which permits balanced control over the volume, velocity, and distribution pattern of the gas.

A general object of this invention is to provide a film shrink oven which has the shortest possible heating cycle to the end that production will be maximized but not at the expense of increased rejects or improper contouring of the film.

Briefly stated, one embodiment of the invention involves an oven which has entry and exit doors on respectively opposite ends. A conveyor runs through the oven from a loading station outside of one door to an unloading station outside the other door. At the top of the furnace is a hot gas generating chamber. This gas is delivered to the interior of the furnace with the novel gas distribution system. As will be explained in greater detail subsequently, this system is characterized by having an array of outlets on the sidewalls and the ceiling of the oven which results in gas flow that is controlled in respect to temperature, volume and velocity. The system shrinks incremental regions of the film in the proper amount and in any desired sequence regardless of the package configuration.

How the foregoing objects and other more specific objects are achieved will appear from time to time in the ensuing more detailed description of a preferred embodiment of the invention taken in conjunction with the drawings.

DESCRIPTION OF A PREFERRED EMBODIMENT

Figure 1:
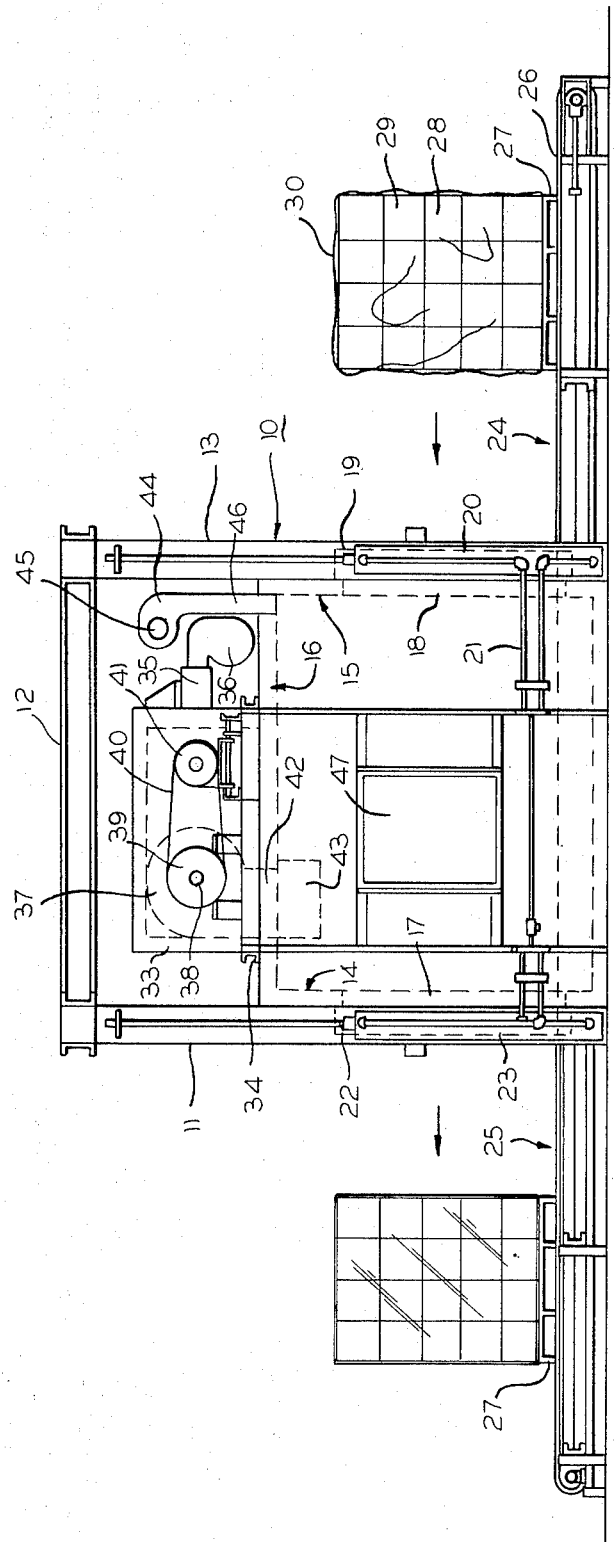
FIG. 1 is a side elevation view of a film shrink oven system embodying the invention.

In FIG. 1 the oven structure is generally designated by the reference numeral 10. It has a frame and superstructure comprised of vertical and horizontal interconnected rigid structural elements such as channel irons 11, 12 and 13. The interior of the oven is outlined by broken lines which are marked 14, 15 and 16 to designate the two sidewalls and the ceiling, respectively. The walls and ceiling are comprised of conventional sheet metal panel sections which are interlocked and have a hollow interior which is occupied by insulating material which is not signified in the drawing.

At each end of the oven the insulating panels have openings such as 17 at the exit end of the oven and 18 at the entry end. Opening 18 is normally covered by a door 19 which is adapted to travel vertically between vertical structural element 13 on the front side and its counterpart on the rear side. The door is pneumatically operated so that packages which are to be processed in the oven may be admitted rapidly without dropping oven temperature appreciably. The pneumatic operator is located in the region 20 and is not shown in detail nor need it be described since it is conventional. A high pressure air line 21 supplies the door operator from a suitable high pressure air reservoir, not shown.

Oven wall exit opening 17 is also covered with a door 22 which is vertically movable between structural element 11 and its rear counterpart as viewed in FIG. 1. Door 22 has a pneumatic operator 23 which is conventional as is the other operator 20 and need not be described.

Extending in the horizontal plane through the oven is a conveyor which is marked with the numeral 24 at the entry or loading station of the oven and with the numeral 25 at the exit or unloading station of the oven. The conveyor may be of the chain link type or it may be an endless belt which is symbolized and marked with the reference numeral 26. The sprockets or other means for driving the conveyor belt translationally are not shown since they are conventional. It is sufficient to be aware that the conveyor may be adapted for translating continuously or it may be driven intermittently dependent on the nature of the article being packaged, the type of film being used, and the oven heating cycle which is required.

As seen in FIG. 1, the loading station of the conveyor supports a typical work load including a pallet 27 on which a number of boxes such as 28 and 29 are stacked three-dimensionally. These boxes may be representative of multiple articles of various configurations. Pallet 27 and the articles thereon are depicted as being covered loosely with a thin plastic film 30. In some instances the film may only surround the articles, leaving the pallet free, and in other instances the film may surround the articles and the pallet as well so as to produce a unitary encasement that is easy to handle and fully sealed after the film is shrunk by application of heat in the oven. Various methods for depositing the loose unshrunk film on the article or articles which are to be processed may be used. For instance, the film 30 may be comprised of a preformed bag which is open on the bottom and slipped over the article or articles to be packaged by a suitable machine at the time or prior to the time that the articles are on the loading station of the conveyor system. The film bag may be of such length as to allow its open end to be folded in under the pallet and the article or articles which it supports or merely under the articles themselves, depending on the type of encasement that is desired. In some applications film is taken off of a roll and wrapped around the article in directions which are perpendicular to each other and the corners are folded in so that they are properly oriented for effecting a good seal when shrinking of the film takes place.

A variety of heat shrinkable films are commercially available at present. Polyethylene films which have been appropriately cross-linked chemically or by means of electron radiation and then prestretched have a propensity for shrinking to their original dimensions when subjected to heat. Polyethylene is available in various thicknesses such as from 1 to 15 mils and it is a tough and inexpensive material so it is widely used for packaging according to the process herein discussed. Heat shrinkable Teflon, polyvinyls and Kel–F are other examples of materials that have been used less generally.

The hot has which is delivered to the interior of the oven for shrinking the film is derived from a gas burner which is located on the roof of the oven. In this particular design, an excess air type of gas fuel burner is used. In other words, the fuel is burned in a chamber in which more air is injected than is necessary for complete combustion in which case the gases of combustion can be fed directly into the oven so as to eliminate the more conventional step of exchanging heat between flowing air and the external surface of a combustion chamber. The combustion chamber is marked with the numeral 33 and is shown supported on a platform 34 which is above the roof of the oven and is tied into the superstructure frame members by structural elements which are not shown.

At one end of the combustion chamber 33 is a burner assembly 35. A blower 36 forces air into burner 35 where it mixes with the gaseous fuel and burns to such complete extent that the gases in chamber 33 contain little, if any, carbon monoxide or other noxious incompletely oxidized gases. The hot gaseous combustion products are comprised mainly of carbon dioxide and nitrogen. This hot gas is forced from chamber 33 into the oven by means of a blower 37 which is inside of chamber 33. The blower shaft 38 extends outside of the chamber 33 where it is provided with a sheave 39. The sheave is driven by a belt 40 which runs over a smaller sheave 41 which may have an adjustable pitch diameter. Sheave 41 is, of course, motor driven. The gaseous combustion products from blower 37 are forced through a duct 42 in the roof of the oven and into a main ceiling duct 43 which is inside of the oven. The manner in which gases are distributed from main duct 43 to the sidewall outlets will be discussed in detail later.

On the remote side of chamber 33 as viewed in FIG. 1, not shown, is another duct which leads from the oven into the chamber. Its purpose is to provide a path for recirculating a major part of the hot gases which are delivered to the interior of the oven in which case heat energy is conserved.

It is, of course, necessary to exhaust gas from the oven or the pressure of its interior would build up and cause undesired leakage of hot gases into the room surrounding the oven. To keep the gas pressure within the oven under control and at the desired level, an exhaust blower 44 is provided. This blower is driven by a motor 45 and connects by means of a duct 46 through the ceiling of the oven and to its interior. With duct work which is not visible in FIG. 1, the exhaust gases withdrawn from the oven are delivered by blower 44 to the atmosphere outside of the building.

On the front side of the oven in FIG. 1 is mounted a control box marked generally with the numeral 47. Since it forms no part of this invention the contents of the control box 47 will not be described in detail except to say that they include blower motor starters and protection devices, gas temperature controls, safety interlocks, start-up timers, conveyor speed controls and the like.

Attention will now be focused on the hot gas distribution system within the oven. As can be surmised from inspection of FIG. 1, the hot gas distribution system must be located on the ceiling and sidewalls of the oven so there will be a clear path for the conveyor and articles transported through the oven thereon. Thus, in FIG. 2 which shows a transverse or end view of the duct work that comprises the gas distribution system of the oven only and omits the insulated oven panels, it is evident that the bottom space marked 50 is clear to accommodate the conveyor which would run perpendicular to the plane of this figure. It is also evident that there is an array of discharge outlets marked 51 on the left side of the oven and marked 52 on the right side of the oven. The interior ceiling of the oven is seen to have ducts running in various directions. Running lengthwise of the oven and extending in the direction in which the packages move on the conveyor is an overhead longitudinal duct which is generally designated by the numeral 54.

For convenience, the hot gas distribution system will first be discussed in general terms in reference to schematic diagram in FIG. 5. In this figure, one may see that the oven is provided with a left side array of gas outlets 51 and a right side array 52 where right and left are determined by viewing through the oven in the direction of the arrow associated with reference numeral 50 which is positioned in the bottom space in which the conveyor is located. As explained earlier, hot gases from chamber 33 on the exterior roof of the furnace are delivered through a short vertical duct 42 and then to an intersecting lateral main ceiling duct 43. Ceiling duct 43 branches into left wall header duct 57 and right wall header duct 58. Main ceiling duct 43 and the wall header ducts 57 and 58, as well as the other duct work, is comprised of sheet metal in the physical embodiment. Since the hot gas distribution system is symmetrical, only that on the left side of the oven as viewed in FIG. 5 will be described for the sake of brevity.

The left wall header duct 57 has two vertical branches 59 and 60. Considering vertical branch 59, one may see that it has a number of lateral sub-branches 61, 62 and 63 which lead to registers that are respectively marked 64, 65 and 66. Vertical duct 59 terminates in an elongated register duct 67 which extends generally lengthwise of the oven interior. The first branch duct 62 which leads to register 65 has a damper 68 in it for the purpose of controlling the volume and velocity of hot gas to register 65. Similarly, branch 61 connection to register 64 has a damper 69 in it and branch 63 leading to register 66 has a damper 70. The lower end of the vertical left wall header duct 59 has a damper 71 for regulating the volume and velocity of hot gas flowing to elongated side register duct 67. The lower end of vertical wall header duct 60 also has a damper 80 for similarly regulating elongated register duct 79.

Vertical wall duct 60 also has three side branches 73, 74 and 75 which connect respectively to registers 76, 77 and 78.

As can be seen on the opposing side of the oven in the frontal view of the various registers or outlets on the right sidewall, each register is equipped with louvers which have two angularly adjustable sets of orthogonal blades for controlling the direction of gas flow in relation to the film covered object which is being subjected to hot gas in the oven. The louvered fronts of the registers are typified by louvers 81, 82 and 83 which are plainly visible in FIG. 5 on the right side of the oven. The coaction between the various dampers in the duct system and the gas outlet louvers will be discussed more fully hereinafter.

Figure 5:
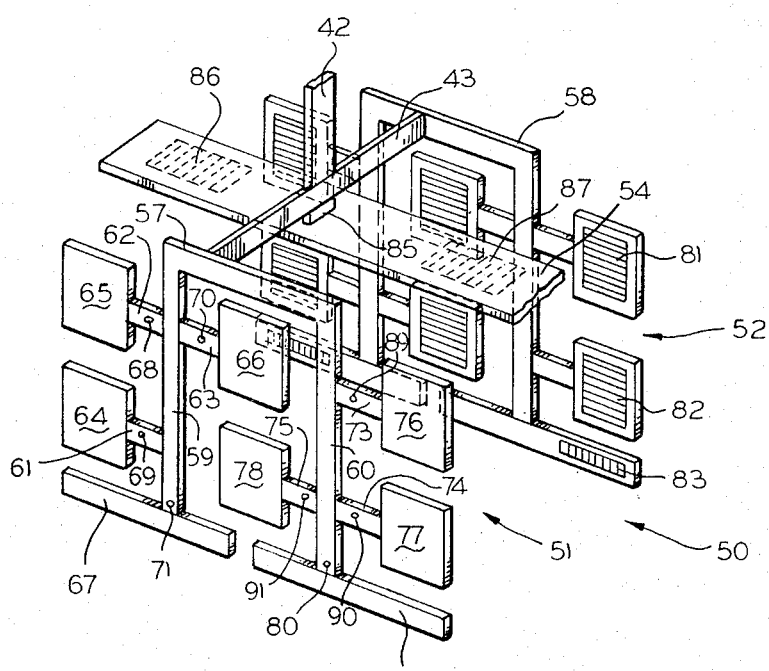
FIG. 5 is a schematic diagram of the principal elements of the gas distribution system isolated from the oven.

The discussion of FIG. 5 thus far explains that hot gases may be projected from the side walls of the oven generally in an opposed horizontal direction but subject to vertical angular selectivity by means of the louvers. Likewise, it should be evident that special attention has been given to projecting a stream of hot gas near the bottom and along the sides of the object which is resting on the conveyor through the agency of elongated ducts 67 and 79 and their counterparts on the other side. How these ducts contribute toward heating the film in the proper area sequence for shrinking in a predetermined fashion will be discussed in greater detail later.

Figure 3:
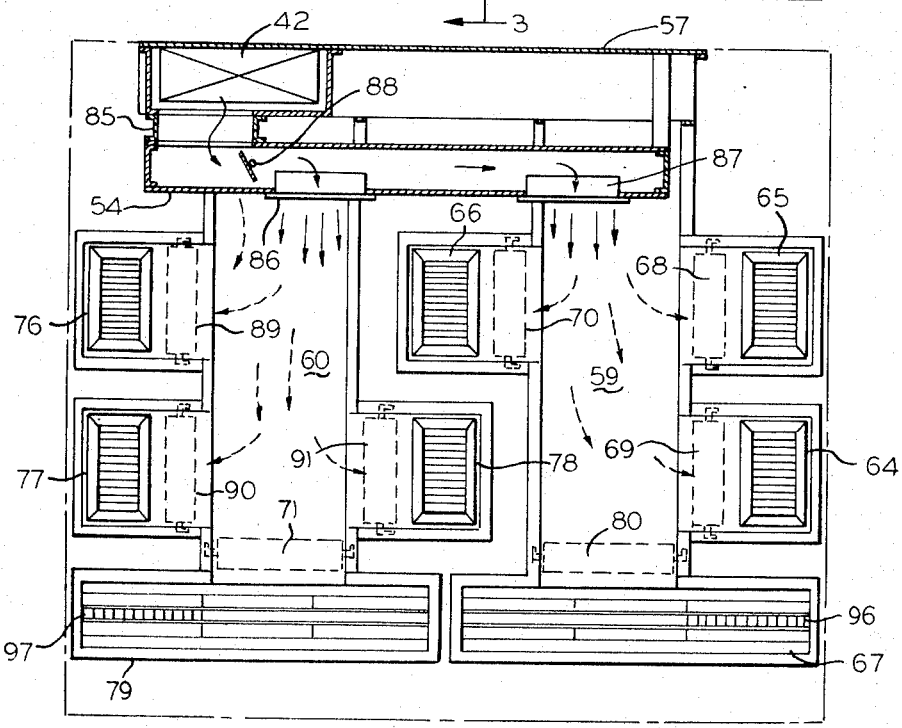
FIG. 3 is a vertical section taken on the lines corresponding with 3—3 in FIG. 2 and showing another aspect of the gas distribution system.

Also in FIG. 5, one may see that means are provided for projecting hot gases downwardly on the object as it stands on the conveyor within the oven. For this purpose the earlier mentioned overhead duct 54 is provided. Duct 54 connects with main ceiling duct 43 by means of a short duct section 85. The bottom of overhead duct 54 is equipped with louvered outlets 86 and 87 of which there are two in this embodiment although different numbers and arrangements may be adopted in some cases. Overhead duct 54 is also equipped with a damper 88 as shown in FIG. 3. Damper 88 and louvers 86 and 87 coact to permit the control of the volume and velocity of hot gas that is projected on the top and partially on the ends of the object which is being heat treated in the oven.

Figure 4:
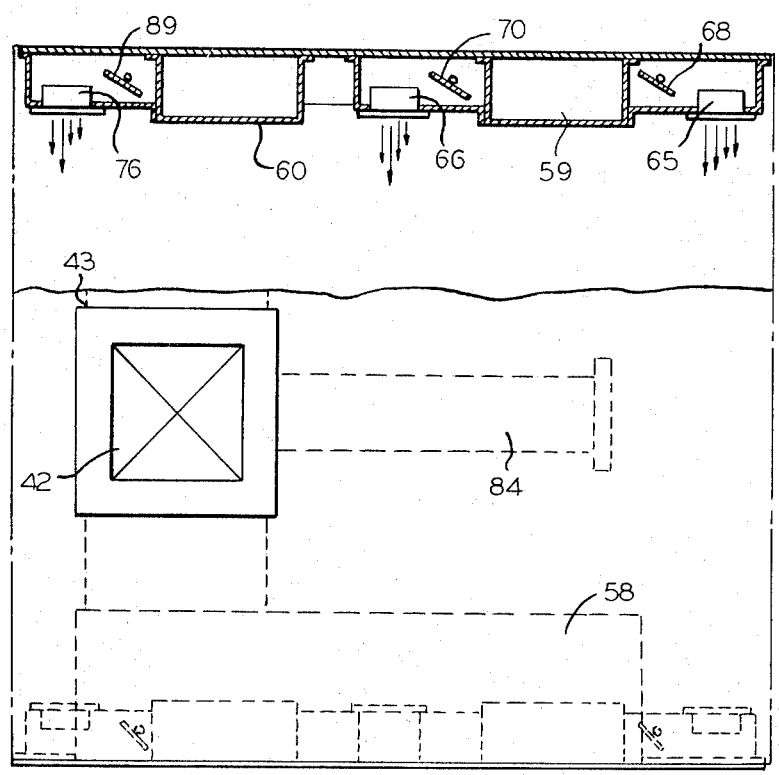
FIG. 4 is a partly plan and partly sectional view of the oven taken on the lines 4—4 in FIG. 2.

Attention is now invited to FIGS. 2, 3 and 4 in connection with which a more complete description of a physical embodiment of the invention will be given.

Figure 2:
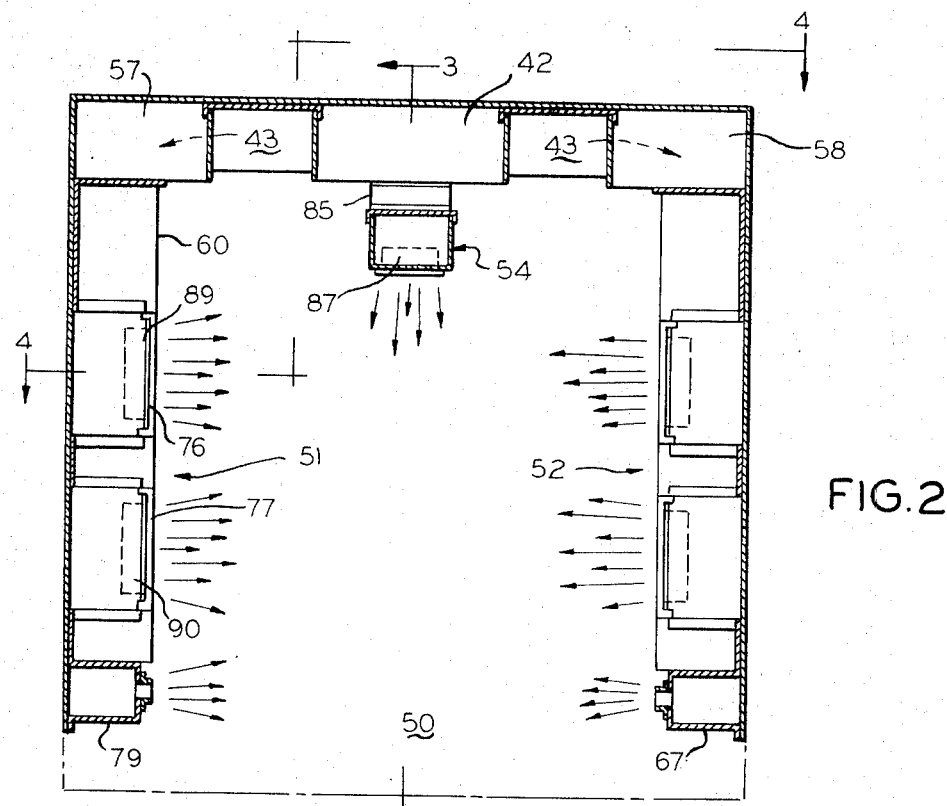
FIG. 2 is a vertical transverse view of the oven as it appears with the ends of the oven and the superstructure removed so as to emphasize some aspects of the gas distribution system.

FIG. 2 is a view looking into the oven with the front and rear walls removed. Since the hot gas distribution system to the left of center is symmetrical with that on the right, only the left side will be described in detail. The same reference numerals that were used in connection with describing the schematic representation of FIG. 5 will be used in the ensuing description of the physical embodiment since the components correspond substantially. In FIG. 2 hot gas is delivered from chamber 33 on the roof of the furnace to central ceiling duct 43. The left branch of duct 43 intersects with a ceiling corner duct 57 which extends perpendicular to the drawing in FIG. 2 and can be seen to be substantially coextensive with the interior of the oven in FIG. 3. On the left sidewall as can be seen in the last two named figures, vertical ducts 59 and 60 extend downwardly from ceiling corner duct 57. Vertical wall duct 59 feeds registers 65, 66 and 64 and bottom register 67. Vertical wall duct 60 feeds hot gases to registers 76, 77 and 78 and finally bottom wall duct 79.

Figure 8:
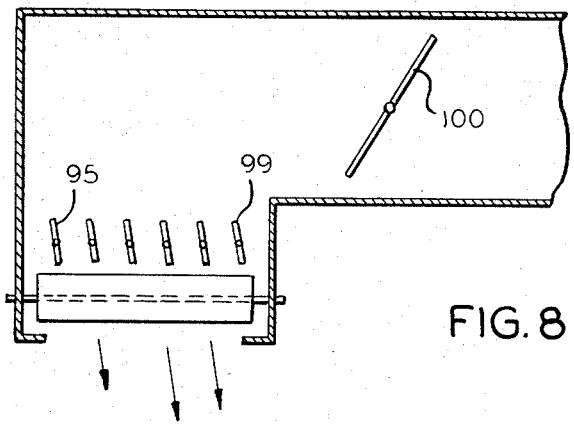
FIGS. 6, 7 and 8 are front, side and top views, respectively, of louver and damper combinations which are used in the new hot gas distribution system.
Figure 6:
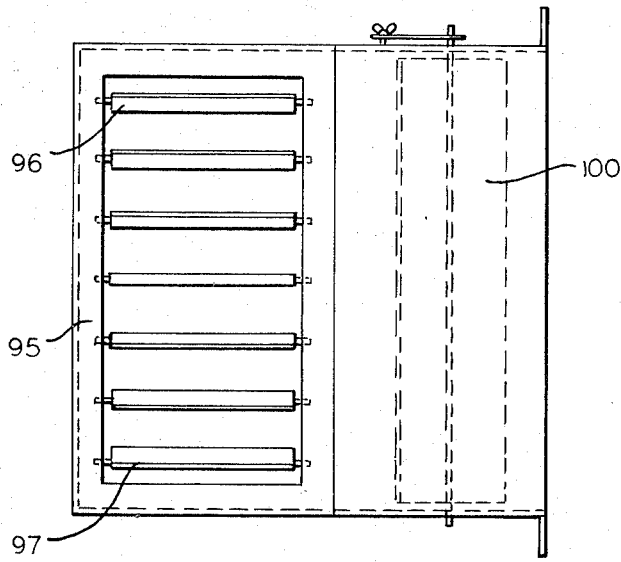
Figure 7:
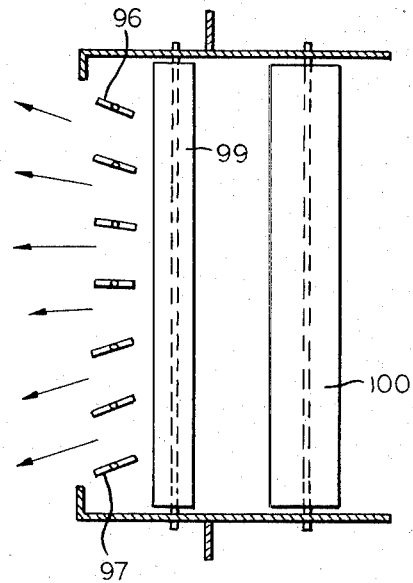

The various registers or gas outlets such as 64–66, 76–78, and 89 are exemplified in FIGS. 6 – 8. In these figures one may see that the registers comprise a frame 95 on which are some pivotally mounted, individually angularly adjustable horizontal blades such as the uppermost blade 96 and the lowermost blade 97. Behind these blades are another set of pivotally mounted individually angularly adjustable vertical blades such as blades 98 and 99. Usually there are about twice as many horizontal blades than there are vertical blades when the outlets are rectangular. In one commercial embodiment of the oven, outlets with 12 vertical and six horizontal blades are used. These blades are individually adjusted angularly so as to obtain the most uniform impingement of hot gases on the shrinkable film as a general rule. The cooperative gas directing action of the two sets of blades results in the desired degree of turbulence and dynamic mixing of the gas so as to eliminate hot spots on the film. Any hot spot on the film resulting from a high velocity concentrated jet of gas would, of course, be subject to puncture so it is the hottest regions that govern the maximum rate at which hot gas can be fed into the oven. Uniform heating leads to minimizing the film shrinking time and increases productivity of the oven in the last analysis.

Hot gases are controlled in respect to direction by the above-described louvers and in respect to volume and velocity by regulating the static pressure of the gas distribution system by means of dampers such as is typified by damper 100 in FIGS. 60– 8. There is a damper of this type in the ducts immediately in advance of each outlet as previously described. Changing the opening adjustment of any damper changes the static pressure in the duct system as well as the velocity pressure at the other dampers and outlets. Thus, it is seen that the whole system may be delicately balanced and controlled by the cooperation of the louvers and the dampers.

The elongated bottom registers 67 and 79 are also provided with angularly directed louvers 96 and 97, respectively. The blades of louvers 96 and 97 are fixed at 45° in one commercial design but they may be rotatable on a vertical axis so that they may direct air at selected horizontal angles. In the illustrated embodiment, the louvers 96 and 97 direct hot gas toward the center of the oven. When this gas reaches the film covered object its velocity pressure is low. The elongated registers 67 and 79 are an important part of the hot gas distribution system since they make it possible to apply more intense heat to the lower ends of the film which covers the object to thereby cause the lower end to shrink rapidly and seize the article. As the upper portions of the film become heated by virtue of gas delivered by the array of registers the accompanying upwardly sequential shrinking which results does not cause the film to draw upwardly and away from the bottom of the articles. This graded application of hot gases and corresponding sequential shrinking of the film from area to area avoids film rupture due to overstress and leads to uniformly covered final product.

As has been indicated, dampers 71, 89, 90 and 91 are interposed in the ducts respectively between a group of registers 79, 76, 77 and 78. These dampers can be positioned angularly to exercise control over the volume of hot gas that is delivered to their associated registers. As the duct opening controlled by any damper is closed down, greater static pressure is built up in the vertical duct 60. The volume of gas delivered to the register which is associated with a throttled down damper will be reduced and gas velocity from that register will also be reduced. Control of gas velocity is, of course, important as has been explained since if velocity is too high on any unsupported film area, the film may rupture because of it being in a soft and fragile state when heated. In prior art systems where the dampers are not used, only the direction of the hot gas can be controlled with the result that there is overheating and underheating of the film at different places. This results in irregular shrinking and film rupture often results. Coordinate use of the dampers and the louvers in the present case permits gas distribution that is controlled in respect to both volume and velocity as well as direction. The other group of registers 64, 65 and 66, fed from vertical duct 59, also have dampers 69, 68 and 70 preceding them in their feed ducts. These combinations of louvered registers and dampers permit balancing and directional control of the hot gas as was just explained with respect to the other group of registers which are fed from vertical duct 60.

The gas distribution system on the one oven wall which was just described is symmetrical and balanced with the distribution system on the opposite wall, and hence, the latter need not be described further. The distribution systems on the sidewalls are primarily for the purpose of projecting hot gas on the sides, ends and near the bottom of the article being packaged in shrinkable film. Controlled heat distribution is also obtained on the tops and ends of the article by use of an elongated overhead duct and register system in accordance with the invention. In FIGS. 2 - 4, which show a physical embodiment of the new oven, the elements of the ceiling distribution system are given the same reference numerals as they are in the schematic diagram of FIG. 5. FIG. 3 shows that ceiling duct 54 is elongated and extends generally in the direction in which articles travel through the oven. This duct 54 is provided on its bottom side with louvered registers 86 and 87, which project hot gas generally downwardly. The louvers are adjustable so that air may be projected at any desired angle against the front and rear ends of an article traversing the oven. Ceiling duct 54 is also provided with a damper 88 which cooperates with the louvered registers to provide control over hot gas volume and velocity. As can be seen particularly well in FIGS. 3 and 4, hot gas is fed from gas chamber 33, on the roof of the oven, down duct 42 from which it flows through a short vertical duct section 85 into ceiling duct 54. The gas is then subject to being throttled by damper 88 after which it discharges through outlet registers 86 and 87.

It is worthy to note in FIG. 3 that the various sidewall registers are arranged in a geometrically uniform pattern and in two different groups. One group comprises registers 76, 77, 78 and 79. This group, which is essentially unsymmetrical by itself, is fed from a common vertical wall duct 60. The other group of registers 64, 65, 66 and 67, are fed from vertical wall duct 59 and they are unsymmetrical by themselves. In combination, however, the two groups are symmetrical. Thus, the vertical wall ducts 59 and 60 supply an equal number of registers over paths of equal lengths so that balancing of the system is facilitated. Note too that one of the center registers 66 is fed from vertical wall duct 59 while the other central register 78 is fed from vertical duct 60 in which case the need for a central vertical wall duct to feed outlet registers 66 and 68 is eliminated.

In a typical commercial embodiment of the oven, hot gas is delivered from chamber 33 to the distribution system at a temperature of 400° to 500° F. Gas volume is adjusted by setting the rotational speed of blower 37 so that a polyethylene film 6 mils thick surrounding an object in the oven can be raised to a temperature of approximately 200° F. in 30 to 45 seconds. The conveyor speed is adjusted for about 20 feet per minute so that from 40 to 50 pallet loads per hour can be run through the oven. This is just a typical example. The gas temperature and production rate would, of course, be varied for films of different types and thicknesses.

Although a preferred embodiment of the invention has been described in considerable detail, such description is to be considered illustrative rather than limiting for the invention may be variously embodied and is to be limited only by interpretation of the claims which follow.

I claim:
1. A film shrink oven comprising:
   a. opposed side walls, opposed end walls, a floor and a ceiling defining an oven,
   b. door means in an end wall for transporting film covered objects into and out of the oven,
   c. a source of hot gas and a main duct means connecting said source to the interior of the oven,
   d. at least two ducts extending vertically down each of the opposite side walls, said vertical ducts being connected for being supplied with hot gas from said main duct,
   e. equal numbers of branch ducts extending from each vertical duct on each wall symmetrically on both sides of the oven,
   f. a gas outlet in each branch duct, the gas outlets being spaced apart uniformly on each side wall with certain of said outlets being located adjacent the ends of the side walls and other of said outlets being located between them, so as to provide a symmetrical and balanced array of outlets on both sides of the oven interior for discharging hot gas generally toward and on opposite sides of the vertical mid-plane of the oven,
   g. louver means for each outlet comprising angularly adjustable blades, for establishing gas flow direction, said louver means being located adjacent said outlet means in the gas flow path from the duct, and
   h. individual dampers associated with each outlet, said dampers being installed in the ducts immediately before each of said outlets.
2. The invention set forth in claim 1 including:
   a. horizontally extending ducts along each side wall near said floor, said horizontal ducts being intersected by and fed from the ends of said vertical ducts and having horizontally elongated outlets, and
   b. louvers in said horizontal outlets which louvers are angulated for directing hot gas generally toward the center of said oven and parallel with said floor.
3. The invention set forth in claim 2 wherein:
   a. said horizontally elongated outlets are respectively at ends of their ducts adjacent the corners of the oven defined by the side walls and end walls.
4. The invention set forth in claim 2 wherein:
   a. there is a damper interposed in the duct leading to each horizontal outlet.
5. The invention set forth in claim 1 wherein:
   a. said outlets are arranged in pairs in which one outlet is above the other, a pair being in the region of a side wall adjacent said end walls, respectively, and a pair being in the center of each side wall substantially midway between the outlets of the other pairs, one of the center outlets being fed through a branch duct from one of said vertical ducts and the other of said center outlets being fed through a branch duct from the other vertical duct on the same wall.
6. The invention set forth in claim 1 including:
   a. an elongated ceiling duct that is fed from said main duct and is horizontally disposed and extends in substantial parallelism with the side walls and over the space between them, the bottom of said last named duct having outlets,
   b. a damper interposed in said ceiling duct in advance of each outlet, and
   c. a louver means installed in each outlet.
7. An oven for heat shrinking film on objects that are transported through the oven comprising:
   a. opposed side walls, opposed end walls, a floor and a ceiling comprising an oven,
   b. a door in each end wall for facilitating transporting film covered objects through the oven,
   c. a source of hot gas,
   d. parallel vertical ducts on each side wall, said ducts being substantially equally spaced apart in a horizontal direction from each other,
   e. branch ducts extending along each wall from the vertical ducts, some of said branch ducts from each vertical duct extending toward said end walls and other of said branch ducts extending toward the center of the wall,
   f. an outlet in each branch duct and a damper interposed in said branch ducts in advance of each of said outlets, the outlets in the central branch ducts being at different elevations and the outlets from the same vertical duct that extend toward the end walls being at different elevations so as to define at least two horizontal rows of duct outlets.
8. The invention set forth in claim 7 including:
   a. elongated horizontal ducts disposed along each of the side walls and being intersected by and connected with the vertical ducts,
   b. a damper located in each vertical duct immediately in advance of each horizontal duct,
   c. said horizontal ducts having horizontally elongated louvered outlets for projecting hot gas at an angle generally toward the center of said oven and in a generally horizontal plane for impinging near the bottom of an object that is in the oven.

* * * * *